(12) United States Patent
Jeong

(10) Patent No.: US 7,760,603 B2
(45) Date of Patent: Jul. 20, 2010

(54) APPARATUS AND METHOD FOR DISCRIMINATING OPTICAL DISC TYPE

(75) Inventor: Kab Kyun Jeong, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 517 days.

(21) Appl. No.: 11/744,478

(22) Filed: May 4, 2007

(65) Prior Publication Data
US 2008/0002548 A1 Jan. 3, 2008

(30) Foreign Application Priority Data
Jun. 30, 2006 (JP) .................. 10-2006-0060996

(51) Int. Cl.
*G11B 7/00* (2006.01)
(52) U.S. Cl. .................. 369/53.23; 369/44.25
(58) Field of Classification Search ............ 369/44.26, 369/44.27, 44.29, 47.55, 53.2, 53.23, 53.31, 369/53.45, 44.25
See application file for complete search history.

(56) References Cited

U.S. PATENT DOCUMENTS

| 6,288,987 | B1 * | 9/2001 | Kumagai | 369/44.29 |
|---|---|---|---|---|
| 6,469,965 | B1 * | 10/2002 | Horita | 369/53.2 |
| 6,608,805 | B2 * | 8/2003 | Ueki | 369/53.23 |
| 6,868,051 | B2 * | 3/2005 | Ogihara | 369/53.2 |
| 6,952,387 | B2 * | 10/2005 | Nishio et al. | 369/53.23 |
| 7,577,072 | B2 * | 8/2009 | Jin | 369/53.2 |
| 2003/0007436 | A1 * | 1/2003 | Komma et al. | 369/53.2 |
| 2004/0196769 | A1 * | 10/2004 | Nakano et al. | 369/53.28 |
| 2005/0265189 | A1 * | 12/2005 | Tai | 369/53.2 |
| 2007/0076546 | A1 * | 4/2007 | Shimizu et al. | 369/44.29 |
| 2007/0230304 | A1 * | 10/2007 | Nakane et al. | 369/53.23 |
| 2007/0263500 | A1 * | 11/2007 | Nakahara et al. | 369/44.27 |
| 2008/0123497 | A1 * | 5/2008 | Nakahara et al. | 369/53.23 |
| 2009/0010129 | A1 * | 1/2009 | Ishibashi et al. | 369/53.22 |

FOREIGN PATENT DOCUMENTS

KR 10-238471 10/1999

* cited by examiner

*Primary Examiner*—Thang V Tran
*Assistant Examiner*—Brenda Bernardi
(74) *Attorney, Agent, or Firm*—Stanzione & Kim LLP

(57) ABSTRACT

An apparatus and method to accurately discriminate an optical disc type in an optical disc system which records and/or reproduces data to and/or from high density optical discs and low density optical discs includes irradiating a laser beam onto a given one of the optical discs, measuring a track error signal generated from light reflected by the given optical disc, comparing a level of the track error signal with a predetermined reference value, and discriminating a type of the given optical disc according to a comparison result.

23 Claims, 6 Drawing Sheets

DVD

HD-DVD

APPARATUS AND METHOD FOR DISCRIMINATING OPTICAL DISC TYPE

CROSS-REFERENCE TO RELATED APPLICATION

This application claims the benefit of Korean Application No. 2006-60996, filed Jun. 30, 2006, in the Korean Intellectual Property Office, the disclosure of which is incorporated herein by reference.

BACKGROUND OF THE INVENTION

1. Field of the Invention

Aspects of the present invention relate to an apparatus and method to discriminate an optical disc type, and more particularly, to an apparatus and method to discriminate an optical optical discs in an optical disc system to record and/or to reproduce data to and/or from an optical disc as a recording medium.

2. Description of the Related Art

As the field of audio/video storage media has been developed, optical discs capable of recording and reproducing high-quality image data and high-quality sound data have been developed and commercialized. Data is generally recorded onto and reproduced from these optical discs, which are types of storage media, through the use of a laser beam. Conventionally, low density optical discs, such as compact discs (CD) or digital versatile discs (DVD), have been widely used. However, in order to overcome the relatively low storage capacity limit of these low density optical discs, companies have developed high density optical discs capable of storing a relatively large amount of data. These high density optical discs, such as a Blu-ray disc-recordable (BD-R), a Blu-ray disc-rewritable (BD-RW) or a high density DVD (HD-DVD), have been recently developed and come into widespread use, and can store for example, at least several dozens of gigabytes of data A low density optical disc is different from a high density optical disc in various ways. The low density optical disc uses a laser beam to record and reproduce data which has a larger wavelength than the laser beam used with the high density optical disc, the low density optical disc has a smaller storage capacity than the high density optical disc, the low density optical disc has a larger track pitch than the high density optical disc, and the low density optical disc has a thicker substrate thickness than the high density optical disc. In recently released optical disc systems, a variety of types of optical discs are used in a single apparatus. Accordingly, the type of optical disc mounted in an optical disc drive must be discriminated before recording data to and reproducing data from the optical disc.

Various methods to discriminate an optical disc type have been suggested. For example, Korean Patent Publication No. 1998-014340 discloses a method for discriminating an optical disc type. In the method for discriminating the optical disc type disclosed in the above publication, an apparatus, which reproduces data from optical discs having different substrate thicknesses, includes a sensor that has a light emitting device which emits a light signal and a plurality of light receiving devices which receives light signals reflected from the optical discs. The light receiving signals are different from one another due to a difference among the thicknesses of the optical discs. The light signals received by the light receiving devices of the sensor are analyzed to discriminate an optical disc type.

However, the above-mentioned method for discriminating the optical disc type can discriminate optical discs having different substrate thicknesses, but has difficulty discriminating between an HD-DVD and a DVD, since the substrate thickness (i.e., the distance between a surface layer and a recording layer) of the HD-DVD is similar to that of the DVD.

SUMMARY OF THE INVENTION

Therefore, it is an aspect of the invention to provide an apparatus and method which are capable of accurately discriminating an optical disc type inserted into an optical disc system which records and/or reproduces data to and/or from high density optical discs and low density optical discs.

It is another aspect of the invention to provide an apparatus and method which are capable of accurately and quickly discriminating an HD-DVD is inserted into the optical disc system, based on data measured using a laser diode for a DVD having a wavelength of 650 nm.

Additional aspects and/or advantages of the invention will be set forth in part in the description which follows and, in part, will be obvious from the description, or may be learned by practice of the invention.

An aspect of the invention provides a method to discriminate an optical disc type in an optical disc system which records data to and reproduces data from a plurality of optical discs having different recording capacities, which includes irradiating a laser beam onto a given one of the optical discs, measuring a track error signal obtained from light reflected from the given optical disc, comparing the level of the measured track error signal with a predetermined reference value, and discriminating a type of the given optical disc according to the comparison.

According to an aspect of the invention, the measurement of the track error signal may include measuring the track error signal by operating a focus servo system which controls a vertical movement of an objective lens relative to the given optical disc, wherein the objective lens forms a laser spot on the given optical disc.

According to an aspect of the invention, the measured track error signal may include a track error signal component generated by a push-pull (PP) method and a track error signal component generated by a differential phase detection (DPD) method.

According to an aspect of the invention, the track error signal component generated by the PP method may be generated using a difference between electric signals outputted from a plurality of split surfaces of a photodiode, which detects the light reflected from the given optical disc.

According to an aspect of the invention, the track error signal generated by the DPD method may be generated using a phase difference between electric signals outputted from a plurality of split surfaces of a photodiode, which detects the light reflected from the given optical disc.

According to an aspect of the invention, the reference values may have predetermined levels corresponding to the PP method and the DPD method to determine whether the track error signal generated by the PP method and the track error signal generated by the DPD method are outputted at a normal level.

According to an aspect of the invention, the discrimination of the type of the given optical disc may include determining that the given optical disc is a high density digital versatile disc (HD-DVD) if both the levels of the track error signal generated by the DPD method and the track error signal generated by the PP method are determined to be less than the corresponding reference values.

According to an aspect of the invention, the discrimination of the type of the given optical disc may include determining that the given optical disc is a non-recorded a digital versatile disc-recordable (DVD-R) if the level of the track error signal component generated by the DPD method is less than the reference value and the level of the track error signal component generated by the PP method is greater than or equal to the reference value.

According to an aspect of the invention, the discrimination of the type of the given optical disc may include determining that the given optical disc is a DVD-ROM (digital versatile disc-read only memory) if the level of the track error signal component generated by the DPD method is greater than or equal to the reference value and the level of the track error signal component generated by the PP method is less than the reference value.

According to an aspect of the invention, the discrimination of the type of the given optical disc may include determining that the given optical disc is a recorded DVD-R (digital versatile disc-recordable) if both the level of the track error signal component generated by the DPD method and the level of the track error signal component generated by the PP method are greater than or equal to the reference value.

Another aspect of the invention provides an apparatus to discriminate an optical disc type in an optical disc system which records data to and reproduces data from a plurality of optical discs having different recording capacities, the apparatus including an optical pickup irradiating a laser beam onto one of the optical discs and measuring a track error signal obtained from light reflected by the given optical disc, and comparing the level of the measured track error signal with a predetermined reference value and discriminating a type of the given optical disc according to the comparison using a controller.

According to another aspect of the invention, the optical pickup controls a vertical movement of an objective lens relative to the optical disc to enable the laser beam to accurately trace a recording layer of the given optical disc, forming a spot on the optical disc with the objective lens.

According to another aspect of the invention, the optical pickup may drive a laser diode having a wavelength of 650 nm used to record data to and/or reproduce data from a DVD, in order to measure the track error signal.

According to another aspect of the invention, the optical pickup may move an objective lens having an aperture ratio of 0.65 used to record data to and/or reproduce data from a DVD, in order to measure the track error signal.

According to another aspect of the invention, the controller may set reference values having predetermined levels to determine whether a track error signal component generated by the PP method and a track error signal component generated by the DPD method are outputted at a normal level, and to determine whether the given optical disc is an HD-DVD or a DVD according to the level of the track error signal generated by the PP method and the level of the track error signal generated by the DPD method.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
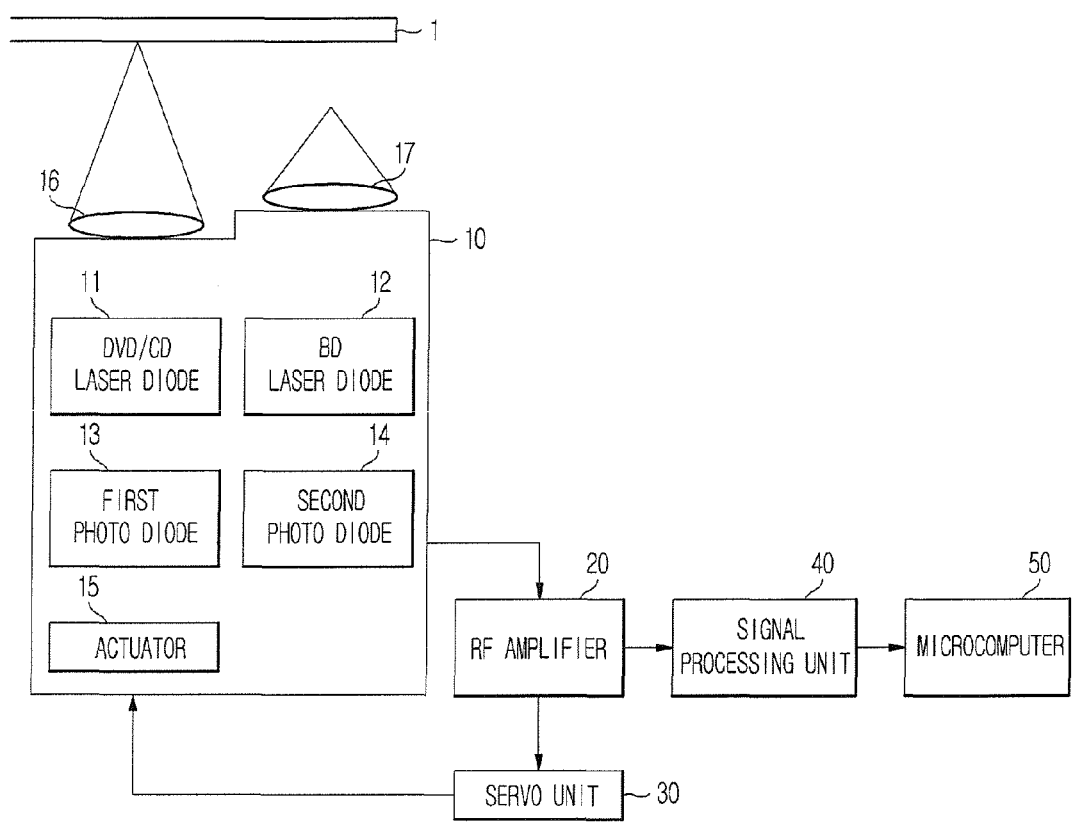
FIG. 1 is a block diagram showing the configuration of an apparatus to discriminate an optical disc type in an optical disc system, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing an apparatus to discriminate an optical disc type in an optical disc system, according to an embodiment of the present invention. The apparatus includes an optical disc 1, an optical pickup 10, a radio frequency (RF) amplifier 20, a servo unit 30, a signal processor 40 and a controller 50. According to an embodiment of the present invention, the controller 50 is a microcomputer. However, the controller 50 is not limited to being a microcomputer, and may instead be many other types of computing devices.

The optical disc 1 is a storage medium which data can be recorded onto and/or reproduced from by using a laser beam. The optical disc 1 may be, but is not limited to being, a low density optical disc such as a compact disc (CD) or a digital versatile disc (DVD), and a high density optical disc such as a Blu-ray recordable disc (BD-R), a Blu-ray rewritable disc (BD-RW) or a high density DVD (HD-DVD). The low density optical disc may further be a read only disc such as a CD, a compact disc-read only memory (CD-ROM), a DVD-ROM, a recordable disc such as a mini disc (MD), a compact disc-recordable disc (CD-R), a CD-rewritable disc (CD-RW), a DVD+RW disc, and a DVD-random access memory (DVD-RAM). Other types of low density and high density optical discs may also be used in accordance with aspects of the present invention. The invention is not limited to discriminating between HD-DVDs, DVD-ROMS, recorded DVD-Rs, and non-recorded DVD-Rs. Instead, aspects of the present invention may be utilized to discriminate between many different types of optical discs which have similar substrate thicknesses. Thus, although an embodiment of the present invention is described using HD-DVDs, DVD-ROMS, recorded DVD-R, and non-recorded DVD-R as an example embodiment, the present invention may work with many other types of optical discs.

The optical pickup 10 irradiates a laser beam onto the surface of the optical disc 1, receives light reflected from the surface of the optical disc 1, and outputs a radio frequency (RF) signal. The optical pickup 10 includes a DVD/CD laser diode 11, which irradiates a laser beam having a wavelength of 650 nm onto the optical disc 1, and a Blu-ray disc (BD) laser diode 12, which irradiates a laser beam having a wavelength of 405 nm onto the optical disc 1. The optical pickup 10 further includes a first photodiode 13 which receives light reflected from the optical disc 1, for example, a DVD or a CD, through four light-detection split surfaces and converts the reflected light into electric signals, and a second photodiode 14 which receives light reflected from the optical disc 1, for example, a Blu-ray disc (BD), through the four light-detection split surfaces and converts the reflected light into electric signals. Also, the optical pickup 10 further includes a DVD/CD objective lens 16 which has an aperture ratio of 0.65, focuses the laser beam irradiated from the DVD/CD laser diode 11 and forms a spot on the DVD or the CD, a BD objective lens 17 which has an aperture ratio of 0.85, focuses the laser beam irradiated from the BD laser diode 12 and forms a spot on the BD, and an actuator 15 which moves the objective lenses 16 and 17.

An optical path to record and reproduce the DVD or CD and an optical path to record and reproduce the BD are separately located in the optical pickup 10. Although not shown in FIG. 1, a collimator lens, which converts divergent light into parallel light, and a beam splitter, which splits incident light, are both provided in each of the optical paths. The optical pickup 10 can record data on a DVD, a CD or a BD and/or reproduce data from a DVD, a CD or a BD.

The RF amplifier 20 receives electric signals from the first and second photodiodes 13 and 14 in the optical pickup 10, generates the RF signal (i.e., reproduction data), and generates a focus error (FE) signal and a track error (TE) signal. The TE signal may be obtained using a variety of methods. In the present embodiment, a track error signal TE=phase[D(A+D)−D(B+C)] is generated by a differential phase detection (DPD) method using phase differences between electric signals outputted from the four light-detection split surfaces A, B, C and D of the first and second photodiodes 13 and 14 shown in FIG. 2, and a track error signal TE=(A+D)−(B+C) is generated by a push-pull (PP) method using differences between electric signals outputted from the four light-detection split surfaces A, B, C and D are obtained. Other methods of obtaining a TE signal may also be used in accordance with the present invention.

The servo unit 30 generates a drive signal to focus, track and control a spindle in the optical pickup 10, using the FE signal and the TE signal outputted from the RF amplifier 20 and a spindle error signal outputted from the microcomputer 50. The signal processing unit 40 processes the RF signal outputted from the RF amplifier 20. The microcomputer 50 controls the optical pickup 10, the RF amplifier 20, the servo unit 30 and the signal processing unit 40 according to an input command of a user.

Hereinafter, the operation and the results of the apparatus and method to discriminate the optical disc type, according to aspects of the present invention, will be described.

Figure 3:
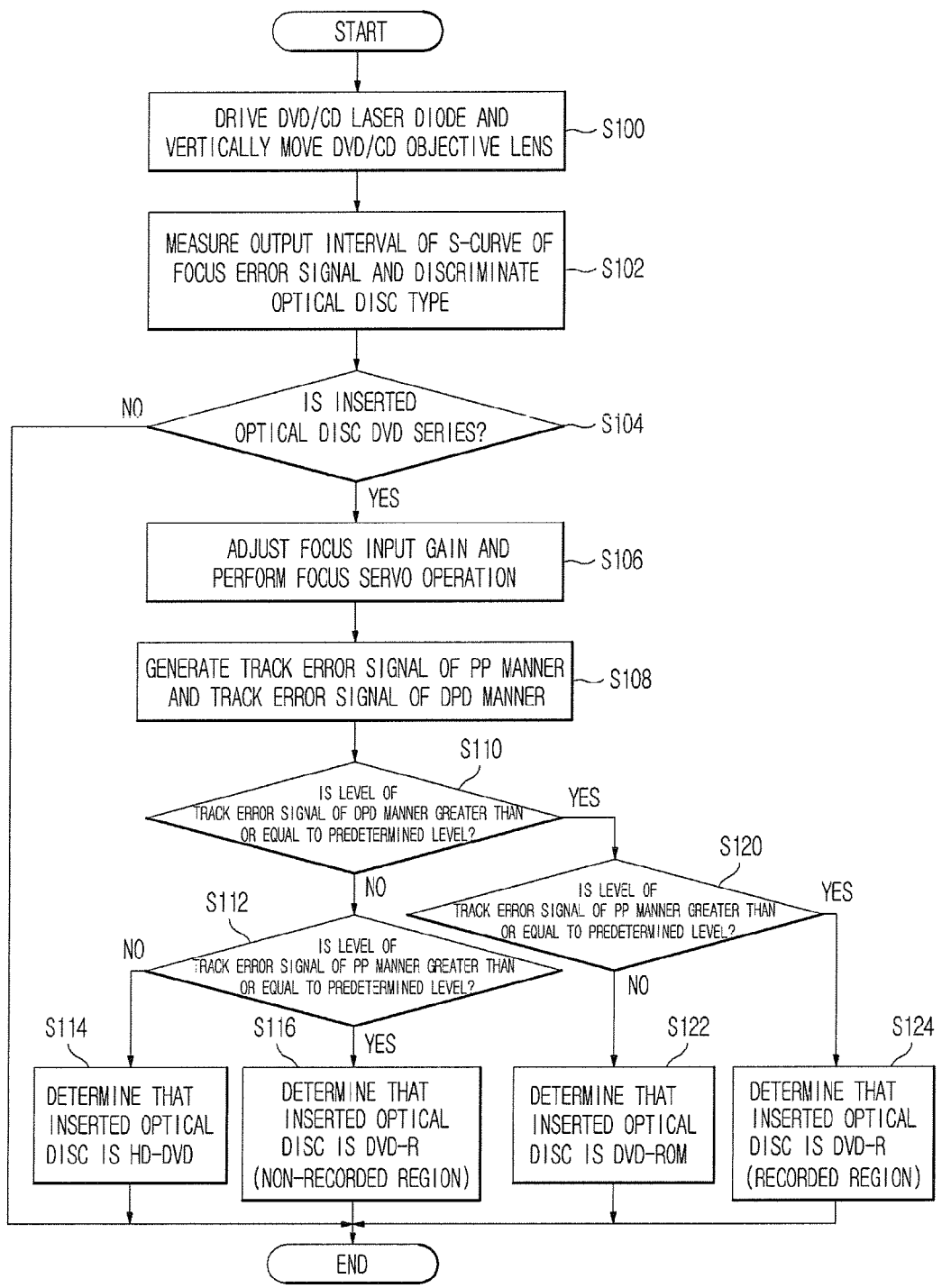
FIG. 3 is a flowchart illustrating a method to discriminate an optical disc type in an optical disc system, according to another embodiment of the present invention.

FIG. 3 is a flowchart showing a method to discriminate an optical disc type in the optical disc system, according to aspects of the present invention. In FIG. 3, when a user inserts the optical disc 1 into a drive of the optical disc system, the optical disc system automatically discriminates the type of the optical disc 1. Specifically, at this point, in the optical disc system, in order to discriminate the type of the optical disc 1, the DVD/CD laser diode 11 is driven to irradiate a laser beam having a wavelength of 650 nm onto the optical disc 1. When the laser beam having the wavelength of 650 nm is irradiated, the actuator 15 is driven to perform a focus search to control a vertical movement of the DVD/CD objective lens 16 so that the DVD/CD objective lens 16 approaches or moves away from the optical disc 1 (Operation S100).

A focal point of the laser beam passes through a recording layer of the optical disc 1 by the focus search to control the vertical movement of the DVD/CD objective lens 16. Accordingly, an S-curve (see Korean Laid-Open Patent Publication No. 2005-0031010) is generated in the FE signal generated in the RF amplifier 20 when the focal point of the laser beam passes through the recording layer. At this time, the output interval of the S-curve varies depending on the type of the optical disc 1 inserted into the optical disc drive.

Since the distance between a surface layer and the recording layer of the optical disc 1 varies depending on the optical disc 1 (for example, the BD distance is 0.1 mm, the DVD and the HD-DVD distance is 0.6 mm, and the CD distance is 1.2 mm), the moment when the focal point of the laser beam passes through the recording layer of the optical disc 1, as the DVD/CD objective lens 16 moves at a constant speed, varies depending on the type of the optical disc 1 reflecting the laser beam. Accordingly, a point of time that the S-curve is outputted varies depending on the type of the optical disc 1 reflecting the laser beam.

The microcomputer 50 measures the output interval of the S-curve in the FE signal generated in the RF amplifier 20 to discriminate the type of the optical disc 1 (Operation S102), and determines whether the discriminated optical disc 1 is a type of optical disc in the DVD series (Operation S104). In order to discriminate the type of the optical disc 1 using the output interval of the S-curve in the FE signal, the output intervals of the S-curve corresponding to the type of the optical disc 1 such as a CD, a DVD and a BD are previously stored in the microcomputer 50.

As the result of the comparison of operation S104, if the inserted optical disc 1 is the DVD series, the microcomputer 50 must accurately determine whether the optical disc 1 is a DVD or a HD-DVD, because the HD-DVD and the DVD are similar to each other in reflectivity, as well as in the distance between the surface layer and the recording layer of the optical disc. When the inserted optical disc 1 is the DVD series, the microcomputer 50 adjusts an input gain of a servo signal based on the result of performing the focus search, and then drives the actuator 15 so that the focal point of the laser beam accurately traces the recording layer of the optical disc 1 by operating a focus servo system to control a vertical movement of the DVD/CD objective lens 16 (Operation S106).

Figure 4:
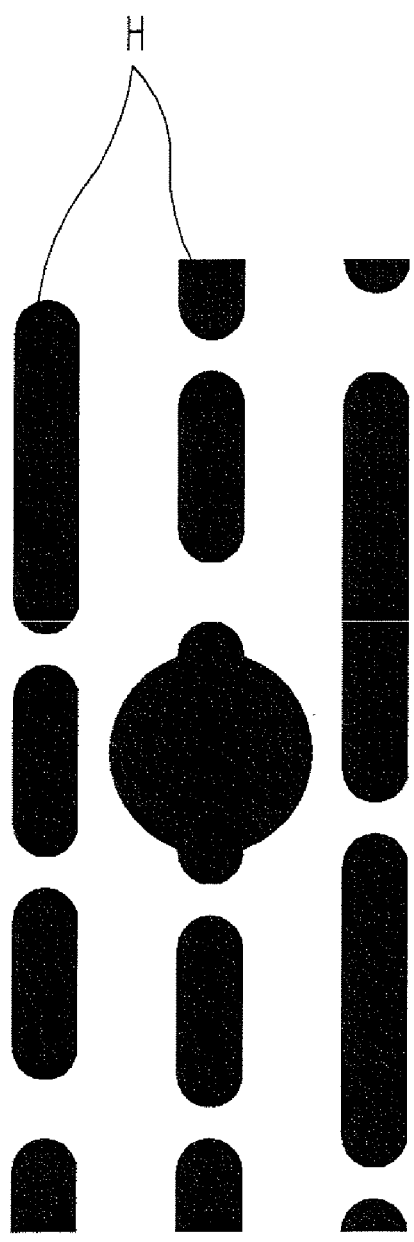
FIG. 4 is a view showing laser spots formed on recording layers of a digital versatile disc (DVD) and a high density digital versatile disc (HD-DVD)
Figure 4:
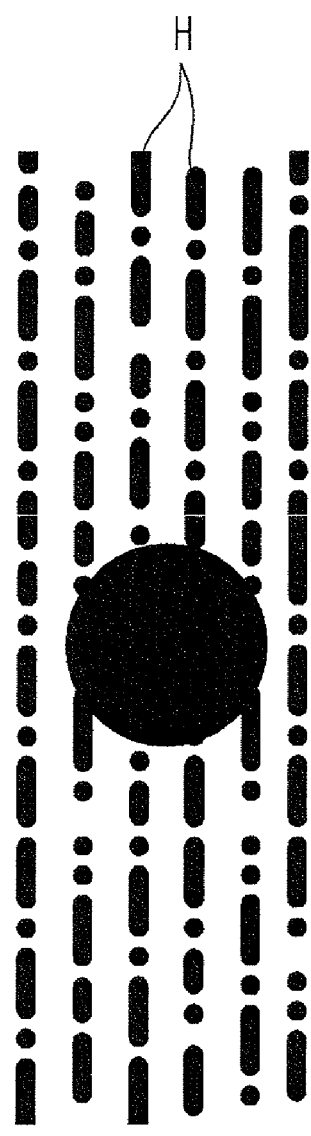

FIG. 4 shows a state where the laser beam is focused on the recording layer of the DVD or the HD-DVD to form a spot thereon. In FIG. 4, each black line H represents a track on the optical disc 1, and black portions in the track represent marks with a space defined therebetween on the optical disc 1. As shown in FIG. 4, the track pitch of the HD-DVD is smaller than that of the DVD. Accordingly, while one track is covered by the spot irradiated onto the DVD, several tracks are covered by the same spot irradiated onto the HD-DVD.

Figure 2:
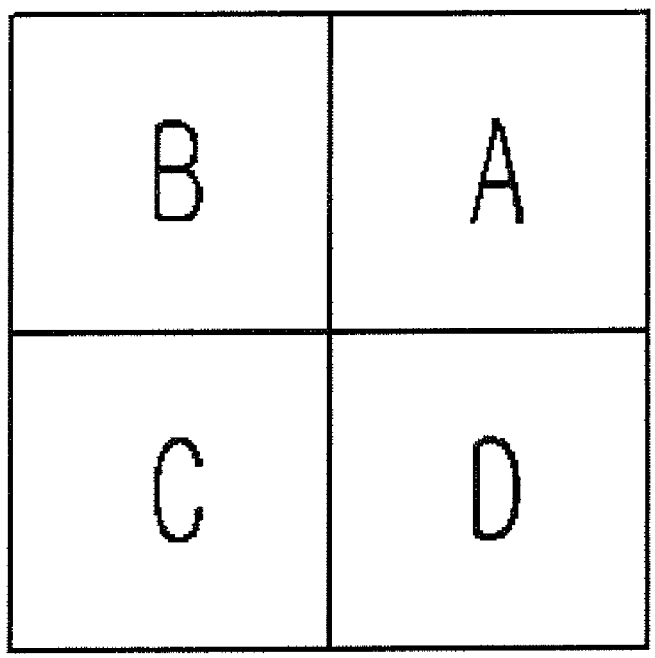
FIG. 2 is a schematic view showing the structure of a photodiode to detect light reflected from an optical disc.

The RF amplifier 20 generates the track error signal component TE=phase[D(A+D)−D(B+C)] using the DPD method, which uses the phase differences between the electric signals outputted from the four light-detection split surfaces A, B, C and D shown in FIG. 2, and generates the track error signal component TE=(A+D)−(B+C) using by the PP method, which uses the differences between the electric signals outputted from the four light-detection split surfaces A, B, C and D shown in FIG. 2. After obtaining these two track error signal components, the RF amplifier 20 transmits the two track error signal components to the microcomputer 50 (Operation S108). Hereinafter, the track error signal component generated by the DPD method will be designated as "DPD actual," the track error signal component generated by the PP method will be designated as "PP actual," the predetermined reference value of the DPD method will be designated as "DPD reference," and the predetermined reference value of the PP method will be designated as "PP reference."

The microcomputer 50 determines whether the level of the track error signal component generated by the DPD method and outputted from the RF amplifier 20 is greater than or equal to the predetermined reference value of the DPD method (DPD actual≧DPD reference) (Operation S110). The predetermined reference value of the DPD method (i.e., the predetermined level of the DPD track error signal) to determine whether the track error signal component generated by the DPD method is a normal signal may be previously stored in the microcomputer 50.

After the determination of operation S110, if the level of the track error signal component generated by the DPD method is less than the predetermined DPD level (DPD actual<DPD reference), the microcomputer 50 determines whether the level of the track error signal generated by the PP method received from the RF amplifier 20 is greater than or equal to the predetermined PP level so as to accurately determine whether the inserted optical disc is an HD-DVD or a non-recorded DVD-R (Operation S112). The predetermined reference value of the PP method (i.e., the predetermined level of the PP track error signal), which is used to determine whether the track error signal of the PP manner is a normal signal, may be previously stored in the microcomputer 50.

Figure 5:
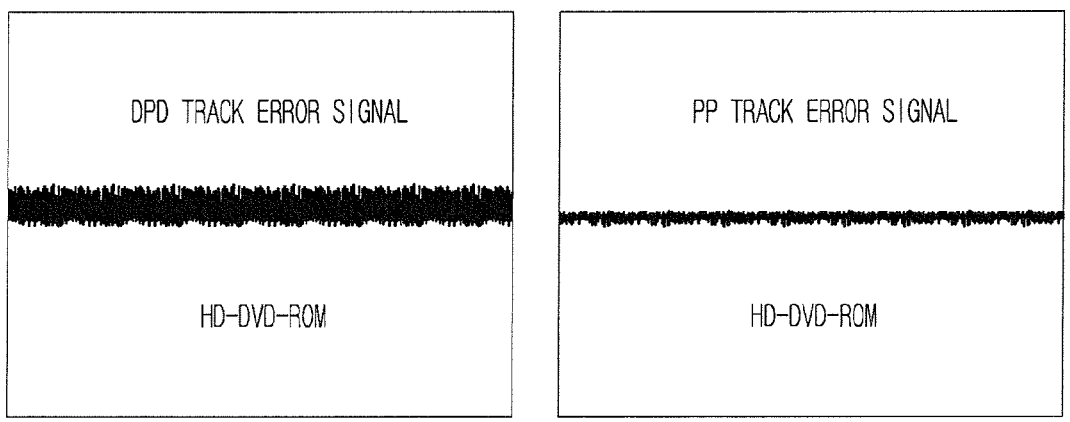
FIG. 5 is a waveform diagram of a track error signal generated by a differential phase detection (DPD) method and a track error signal generated by a push-pull (PP) method measured for an HD-DVD.

As the determined result of operation S112, if the level of the track error signal component generated by the PP method is less than the predetermined PP level (PP actual<PP reference), the microcomputer 50 determines that the inserted optical disc 1 is an HD-DVD (Operation S114). FIG. 5 shows waveforms of the track error signal component generated by the DPD method and the track error signal generated by the PP method measured when an HD-DVD is inserted into the optical disc drive. Referring to FIG. 5, since the level of the focal point of the laser beam is greater than that of a recording unit in the HD-DVD, the track error signal component generated by the DPD method is not generated normally. Accordingly, when the optical disc 1 is an HD-DVD, the level of the track error signal component generated by the DPD method is close to 0 and the level of the track error signal component generated by the PP method is also close to 0.

Figure 6:
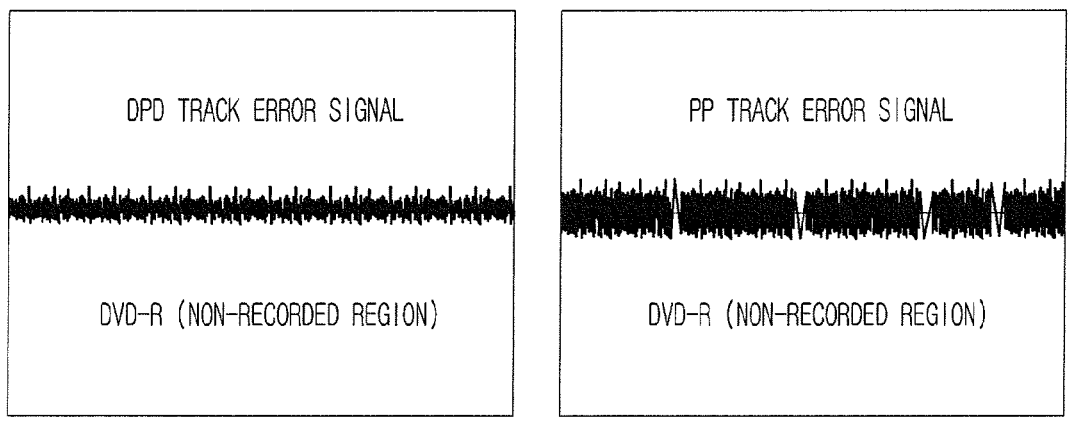
FIG. 6 is a waveform diagram of a track error signal generated by the DPD method and a track error signal generated by the PP method measured for a non-recorded DVD-readable (DVD-R)

Meanwhile, if the microcomputer 50 determines in operation S112 that the level of the track error signal component generated by the PP method is greater than or equal to the predetermined PP level (PP actual≧PP reference), the microcomputer 50 determines that the inserted optical disc 1 is a non-recorded DVD-R (Operation S116). FIG. 6 shows waveforms of the track error signal generated by the DPD method and the track error signal generated by the PP method measured in a non-recorded DVD-R inserted into the optical disc drive. Referring to FIG. 6, in the non-recorded DVD-R, the level of the track error signal component generated by the DPD method is close to 0, but the track error signal of the PP manner is outputted normally.

As the result of the determination of operation S110, if the microcomputer 50 determines that the level of the track error signal component generated by the DPD method is greater than or equal to the predetermined DPD level (DPD actual≧DPD reference), the microcomputer 50 determines whether the level of the track error signal component generated by the PP method outputted from the RF amplifier 20 is greater than or equal to the predetermined PP level in Operation S120 to accurately determine whether the inserted optical disc 1 is a DVD-ROM or a recorded DVD-R.

Figure 7:
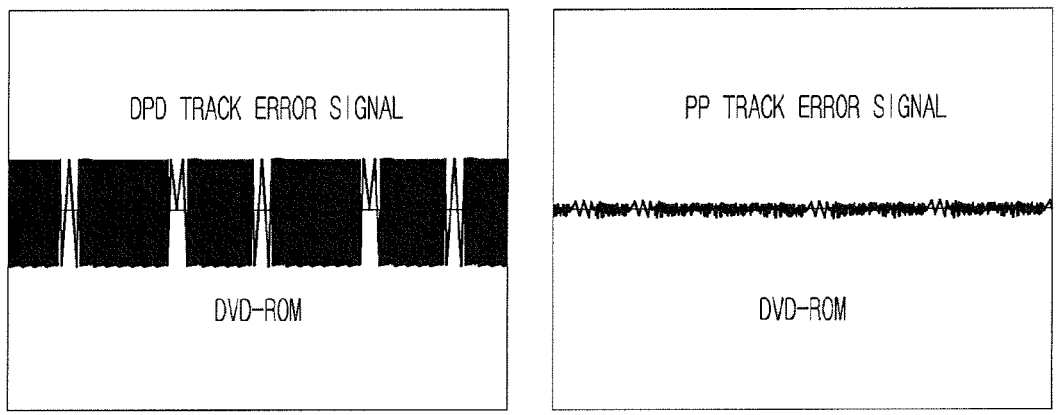
FIG. 7 is a waveform diagram of a track error signal generated by the DPD method and a track error signal generated by the PP method measured for a DVD-read only memory (DVD-ROM)

As the result of the determination of operation S120, if the microcomputer 50 determines that the level of the track error signal component generated by the PP method is less than the predetermined PP level (PP actual<PP reference), the microcomputer 50 determines that the inserted optical disc 1 is a DVD-ROM (Operation S122). FIG. 7 shows waveforms of the track error signal generated by the DPD method and the track error signal generated by the PP method measured when a DVD-ROM is inserted into the optical disc drive. Referring to FIG. 7, when the inserted optical disc 1 is a DVD-ROM, the track error signal component generated by the DPD method is outputted normally, but the level of the track error signal component generated by the PP method is close to 0.

Figure 8:
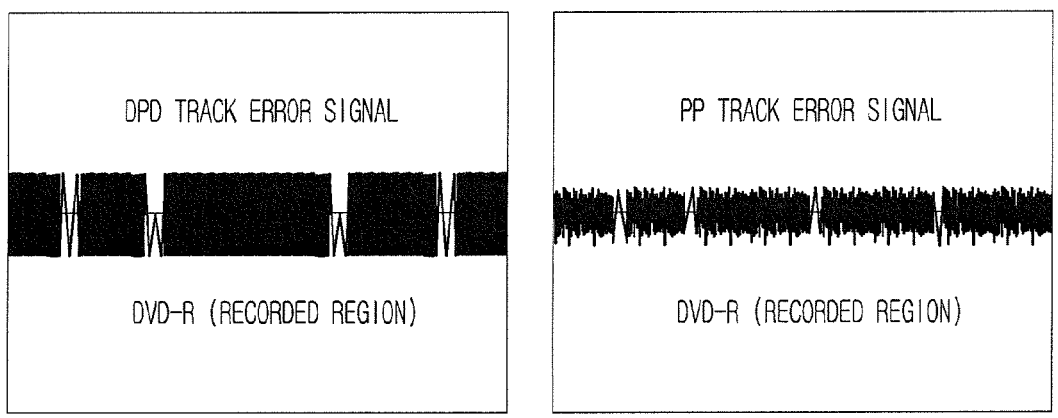
FIG. 8 is a waveform diagram of a track error signal generated by the DPD method and a track error signal generated by the PP method measured for a recorded DVD-readable (DVD-R).

Meanwhile, as the result of the determination of operation S120, if the microcomputer 50 determines that the level of the track error signal generated by the PP method is greater than or equal to the predetermined PP level (PP actual≧PP reference), the microcomputer 50 determines that the inserted disc 1 is the recorded DVD-R (Operation S124). FIG. 8 shows waveforms of the track error signal component generated by the DPD method and the track error signal component generated by the PP method measured when a recorded DVD-R is inserted into the optical disc drive. Referring to FIG. 8, in the recorded DVD-R, both the track error signal component generated by the DPD method and the track error signal component generated by the PP method are outputted normally. It is understood that the recorded DVD-R may have regions which are not recorded on the recorded DVD-R, and that the non-recorded DVD-R may have regions which are recorded on the non-recorded DVD-R.

According to aspects of the present invention, it is possible to accurately discriminate between a DVD and a HD-DVD using both the levels of the track error signal component generated by the PP method and the track error signal component generated by the DPD method, without being influenced by various set deviations, such as a deviation in sensitivity of the photodiodes 13 and 14, or a light output deviation. Furthermore, when the inserted disc is a DVD, it is possible to accurately and quickly discriminate whether the inserted disc is a DVD-ROM, a recorded DVD-R, or a non-recorded DVD-R. When the type of the inserted optical disc is discriminated, the recording and reproducing operations of the optical disc 1 are performed according to the operation command of the user.

As described above, according to aspects of the present invention, it is possible to accurately discriminate the type of the optical disc inserted into an optical disc system which records and/or reproduces data to and/or from high density optical discs and low density optical discs.

Since aspects of the present invention make it possible to discriminate between a DVD and an HD-DVD using an optical system which records and/or reproduces data to and/or from a general DVD, it is possible to accurately discriminate a disc type and to reduce the amount of time necessary to discriminate the disc type. Furthermore, since aspects of the present invention only use information on the level of a track error signal, the optical disc discrimination is unlikely to be influenced by a set deviation, and thus yield can increase.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to discriminate an optical disc type in an optical disc system which records and/or reproduces data to and/or from a plurality of optical discs having different recording capacities, the method comprising:

radiating a laser beam onto a given one of the optical discs and measuring a track error signal obtained from light reflected by the given optical disc, the track error signal comprising a track error signal component, PP actual, generated by a push-pull (PP) method, and a track error signal component, DPD actual, generated by a differential phase detection (DPD) method;

comparing the measured track error signal with a predetermined reference value, PP reference, corresponding to the PP actual, and a predetermined reference value, DPD reference, corresponding to the DPD actual; and discriminating a type of the given optical disc according to the comparison, such that if both the PP actual and the DPD actual are respectively less than the PP reference and the DPD reference, the optical disc is determined to be a high-density digital versatile disc (HD-DVD).

2. The method according to claim 1, wherein the measurement of the track error signal comprises operating a focus servo system that controls a vertical movement of an objective lens relative to the given optical disc, such that the objective lens forms a laser spot on the given optical disc.

3. The method according to claim 1, wherein the PP actual is generated using a difference between electric signals outputted from a plurality of split surfaces of a photodiode that detects the light reflected by the given optical disc.

4. The method according to claim 1, wherein the DPD actual is generated using a phase difference between electric signals outputted from a plurality of split surfaces of a photodiode that detects the light reflected by the given optical disc.

5. The method according to claim 1, wherein the optical discs have approximately the same substrate thicknesses.

6. The method according to claim 1, wherein the discrimination of the type of the given optical disc comprises determining that the given optical disc is the non-recorded DVD-R, if the DPD actual is less than the DPD reference and the PP actual is greater than or equal to the PP reference.

7. The method according to claim 1, wherein the discrimination of the type of the given optical disc comprises determining that the given optical disc is the DVD-ROM, if the DPD actual is greater than or equal to the DPD reference and the PP actual is less than the PP reference.

8. The method according to claim 1, wherein the discrimination of the type of the given optical disc comprises determining that the given optical disc is the recorded DVD-R, if both the DPD actual and the PP actual are respectively greater than or equal to the DPD reference and the PP reference.

9. An apparatus to discriminate an optical disc type in an optical disc system which records and/or reproduces data to and/or from a plurality of optical discs having different recording capacities, the apparatus comprising:

an optical pickup to irradiate a laser beam onto a given one of the optical discs and to measure a track error signal obtained from light reflected by the given optical disc, the track error signal comprising a track error signal component, PP actual, generated by a push-pull (PP) method and a track error signal component, DPD actual, generated by a differential phase detection (DPD) method; and a controller to compare the measured track error signal with a a stored push pull track error signal component, PP reference, and a stored differential phase detection track error signal component, DPD reference, to determine whether the PP actual and the DPD actual are output normally, in order to determine whether the given optical disc is a high-density digital versatile disc (HD-DVD).

10. The apparatus of claim 9, wherein the controller comprises a microcontroller.

11. The apparatus according to claim 9, wherein the optical pickup controls a vertical movement of an objective lens relative to the given optical disc, so that the laser beam accurately traces a recording layer of the given optical disc, and so that the objective lens forms a spot on the given optical disc.

12. The apparatus according to claim 9, wherein the optical pickup drives a laser diode having a wavelength of 650 nm, which is used to record data to and/or reproduce data from a DVD, in order to measure the track error signal.

13. The apparatus according to claim 9, wherein the optical pickup moves an objective lens having an aperture ratio of 0.65, which is used to record data to and/or reproduce data from a DVD, in order to measure the track error signal.

14. The apparatus according to claim 9, wherein the controller determines that the given optical disc is the HD-DVD, if both the DPD actual the PP actual are respectively less than the DPD reference and the PP reference.

15. The apparatus according to claim 9, wherein the controller determines that the optical disc is the non-recorded DVD-R, if DPD actual is less than the DPD reference, and the PP actual is greater than or equal to the PP reference.

16. The apparatus according to claim 9, wherein the controller determines that the given optical disc is the DVD-ROM, if the level of the DPD actual greater than or equal to the DPD reference, and the PP actual is less than PP reference.

17. The apparatus according to claim 9, wherein the controller determines that the given optical disc is the recorded DVD-R, if both of the DPD actual and the PP actual are respectively greater than or equal to the DPD reference and the PP reference.

18. An apparatus to discriminate an optical disc type in an optical disc system which records and/or reproduces data to and/or from a plurality of optical discs having different recording capacities, the apparatus comprising:

an optical pickup to irradiate a laser beam onto a given one of the optical discs, to measure a track error signal component, PP actual, generated by a push-pull (PP) method, and to measure a track error signal component, DPD actual, generated by a differential phase detection (DPD) method; and a controller to compare PP actual to a predetermined reference value PP reference and to compare DPD actual to a predetermined reference value DPD reference, wherein the controller determines that the given optical disc is a high-density digital versatile disc (HD-DVD) if:

PP actual<PP reference, and

DPD actual<DPD reference.

19. The apparatus of claim 18, wherein the controller comprises a microcomputer.

20. The apparatus of claim 18, wherein the optical discs of different recording capacities have approximately the same substrate thicknesses.

21. The apparatus of claim 18, wherein the controller determines that the given optical disc is the non-recorded DVD-R if:

PP actual$\geq$PP reference; and

DPD actual<DPD reference.

22. The apparatus of claim 18, wherein the controller determines that the given optical disc is the DVD-ROM if:

PP actual<PP reference; and

DPD actual$\geq$DPD reference.

23. The apparatus of claim 18, wherein the controller determines that the given optical disc is the recorded DVD-R if:

PP actual$\geq$PP reference; and

DPD actual$\geq$DPD reference.

* * * * *